Aug. 25, 1959  D. T. AYERS, JR  2,900,963
FLUID MOTOR
Filed March 8, 1954  2 Sheets-Sheet 1
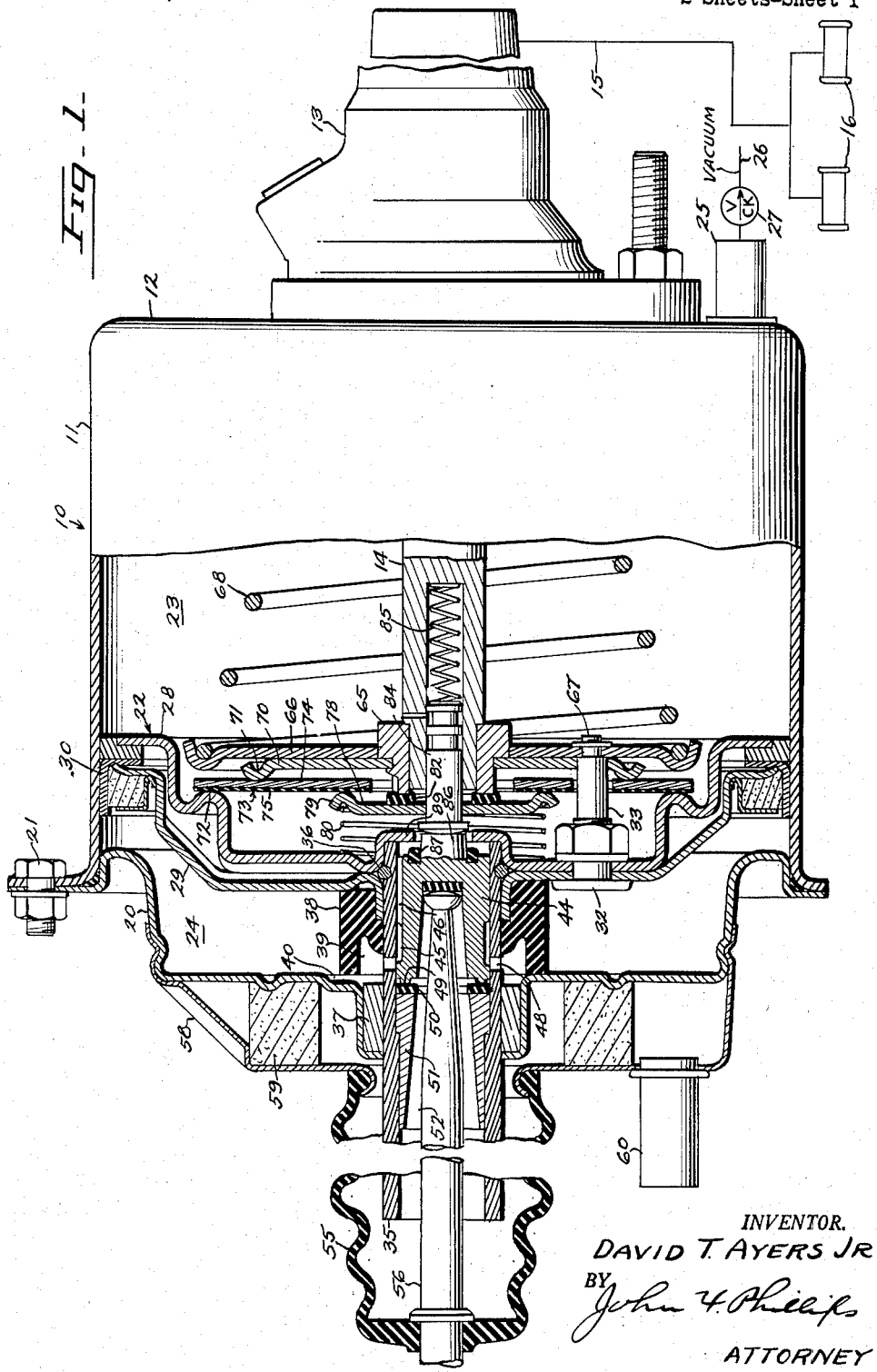
INVENTOR.
DAVID T. AYERS JR.
BY John 4. Phillips
ATTORNEY Aug. 25, 1959 D. T. AYERS, JR 2,900,963
FLUID MOTOR
Filed March 8, 1954 2 Sheets-Sheet 2
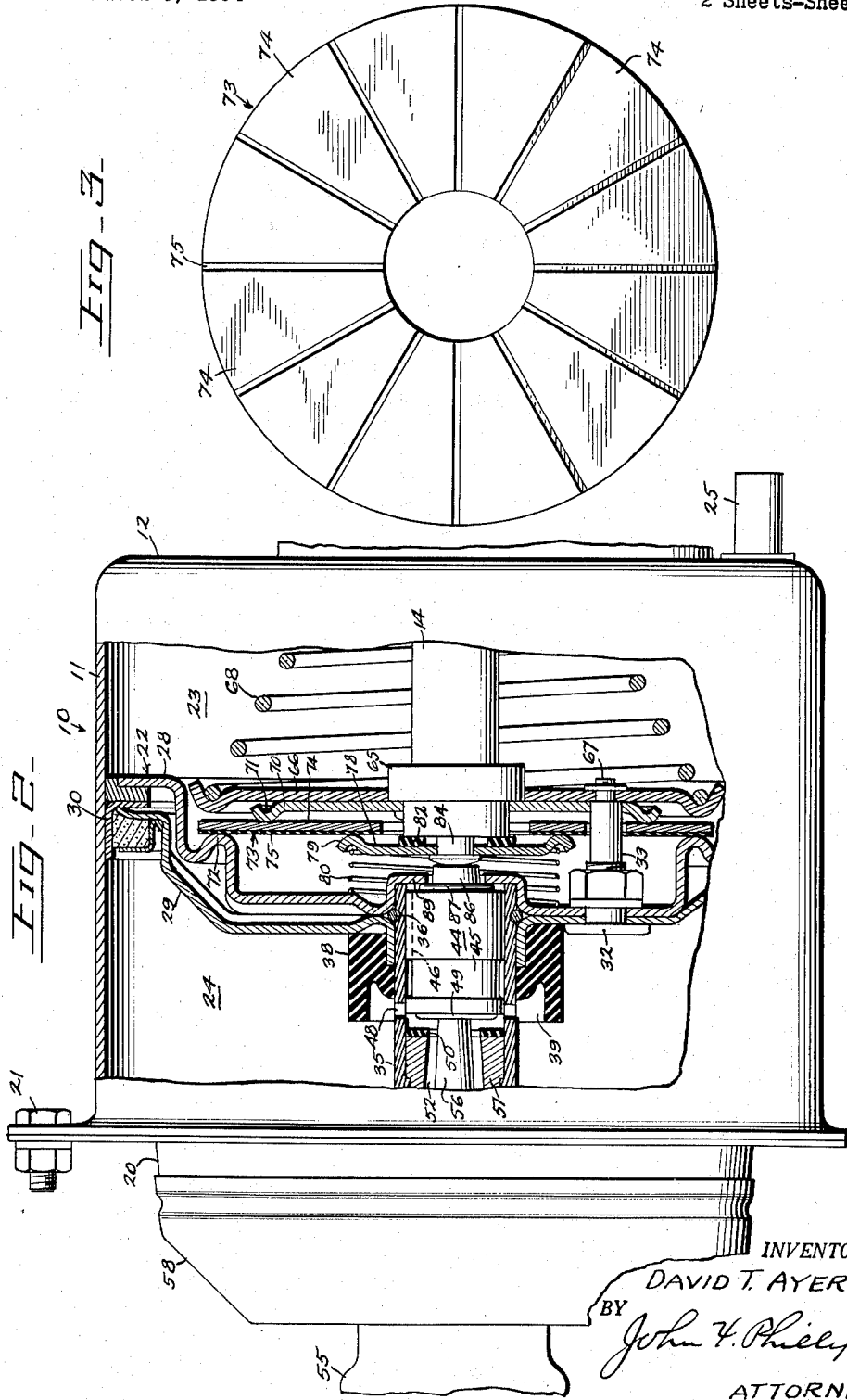
INVENTOR.
DAVID T. AYERS JR.
BY John V. Phillips
ATTORNEY United States Patent Office 2,900,963
Patented Aug. 25, 1959

2,900,963
FLUID MOTOR

David T. Ayers, Jr., Birmingham, Mich., assignor to Kelsey-Hayes Company, a corporation of Delaware Application March 8, 1954, Serial No. 414,764

13 Claims. (Cl. 121—41)

This invention relates to a fluid motor particularly for use in a booster brake mechanism and is an improvement over the construction shown in the pending application of Jeannot G. Ingres, Serial No. 394,683, filed November 27, 1953.

In the co-pending application referred to, there is disclosed a booster brake mechanism having a differential fluid pressure operated motor for assisting the operator in generating hydraulic pressures for the application of the vehicle brakes. Such prior construction is highly advantageous in a number of respects. For example, it provides for a highly desirable "soft" pedal, that is, a construction wherein the brake pedal is initially movable from off position against minimum resistance. It also provides a novel type of lever mechanism operable in accordance with hydraulis pressures in the master cylinder for reacting against the pedal to provide the latter with highly accurate "feel."

Another of the features of the pending application referred to lies in the use of a simplified type of slide valve, and more specifically, a spool valve, for providing a follow-up control energization of the booster motor. As is well known, a valve of this type is subject to leakage therearound and leakage is prevented in the co-pending application referred to by providing the follow-up valve with an annular valve element at one end engageable with a deformable seal in the off positions of the parts, thus effectively preventing the leakage of air into the motor when the brake is not operating. Thus the motor is effectively maintained vacuum suspended.

The co-pending application referred to is subject to fluid leakage around the valve in every other position except the off position when the deformable seal is engaged by the valve element referred to. In normal operation of the mechanism, this leakage makes no difference. However, if a failure of power should occur during brake application, leakage of fluid past the valve will gradually restore balanced pressures in the motor, thus rendering the latter ineffective for assisting in the application of the brakes.

An important object of the present invention is to provide a booster brake mechanism of the character referred to wherein the valve not only is sealed in the off position, but also in the fully on position whereby, upon a failure of power for the booster motor, such motor will remain indefinitely energized to bring the vehicle quickly to a full stop.

A further object is to provide such a construction wherein the desired results are accomplished with simple and inexpensive additions to the prior construction referred to.

A further object is to provide a booster brake mechanism of the type referred to wherein, after a predetermined hydraulic pressure has been built up in the master cylinder, play which normally exists between the parts is taken up so that the operator's foot pressure assists the motor in applying the brakes, and to provide novel and simple means operable under the latter conditions for assisting in the transmission of force to the motor operated fluid displacing plunger and for sealing the valve against leakage.

Other objects and advantages of the invention will become apparent during the course of the following description.

In the drawings I have shown one embodiment of the invention. In this showing:

Figure 1 is an axial sectional view through a brake booster motor and associated elements, parts being shown in elevation and parts being broken away and all of the parts being in their off positions, Figure 2 is a similar view showing the valve and other parts in the fully motor energized positions, and Figure 3 is a face view of the lever device.

Referring to Figures 1 and 2, the numeral 10 designates a fluid motor shown in the present instance as being of the vacuum type and comprising a cylinder 11 having an integral head 12 at one end to which is connected the suitable master cylinder 13. A plunger 14 is movable into the master cylinder as described below to displace fluid through conventional brake lines 15 to the vehicle wheel cylinders, two of which have been diagrammatically shown in Figure 1 and indicated by the numeral 16.

The other end of the cylinder 11 is provided with a stamped or pressed head 20 secured to the cylinder 11 as at 21. Within the cylinder 11 is arranged a pressure responsive unit 22 dividing the cylinder to form a constant pressure chamber 23 and a variable pressure chamber 24. As will become apparent, the motor 10 is preferably of the vacuum suspended type, and the head 12 is provided with a nipple 25 for connection with a suitable duct 26 leading to the intake manifold or other source of vacuum and having therein a check valve 27.

The pressure responsive unit 22 comprises a pair of plates 28 and 29 shaped in cross-section as shown in Figures 1 and 2 and cooperating to support in position suitable packing cup means 30 slidable in the cylinder 11. The plates 28 and 29 are secured together by bolts 32, each of which has a projecting shank 33 for a purpose to be described.

The plates 28 and 29 are mounted on an axially elongated sleeve 35 and are fixed against longitudinal movements along such sleeve by a snap ring 36. The sleeve 35 in slidable in any desirable form of bearing and sealing means, as shown very generally in Figure 1 and indicated by the numeral 37. The bearing and sealing means is carried by the head 20, as shown. Surrounding the sleeve 35 and abutting the plate 29 is a rubber bumper 38 which limits movement of the pressure responsive unit 22 to the off position shown in Figure 1. The bumper 38 is formed with an internal chamber 39 which communicates with the motor chamber 24 in the off positions of the parts through a goove 40 stamped in the cylinder head 20.

A valve 44 is slidable in the sleeve 35 and is preferably of the spool type shown in Figures 1 and 2. This valve is provided with an annular groove 45 communicating through the right-hand end of the sleeve 35 by means of a longitudinal groove 46. The groove 45 is in constant communication with the chamber 39, in the off positions of the parts, through radial ports 48 in the sleeve 35. One end of the valve 44 is provided with an annular valve element 49 engaging a deformable seat 50 when the parts are in the off positions shown in Figure 1. The seal 50 is mounted on the end of a sleeve 51 fixed within the sleeve 35. The space 52 within the sleeves 35 and 51 communicates through the open left-hand end of the sleeve 35, as viewed in Figure 1, with the interior of a boot 55 fixed to an operating rod 56 for the valve 44. This rod is mechanically connected in any suitable manner to the brake pedal to be moved to the right as viewed in Figure 1 when the brake pedal is depressed.

A shell 58 is fixed to the cylinder head 20 and forms therewith a space in which is arranged an air cleaner 59. Air is supplied to the shell 58 radially outwardly of the air cleaner 59 through a nipple 60. The adjacent end of the boot 55 is connected to the shell 58 as shown in Figure 1 and the space within the boot communicates with the space within the air cleaner 59.

The hydraulic plunger 14 is provided with a collar 65 surrounded by a plate 66. The shanks 33 of the bolts 32 have reduced projecting ends 67 for fixing the plate 66 in position as shown. The plate 66 is engaged by a conventional return spring 68 which urges the pressure responsive unit to the off position shown. Against the plate 66 is arranged another somewhat smaller plate 70 having an annular shoulder 71 forming a fulcrum shoulder as further described below.

Outwardly of the shoulder 71, the plate 28 is provided with a fulcrum shoulder 72, the shoulders 71 and 72 being spaced longitudinally of the motor and facing in opposite directions.

Between the shoulders 71 and 72 is arranged a lever device indicated as a whole by the numeral 73. This device comprises a plurality of segmental lever elements 74 having their adjacent edges slightly spaced as shown in Figure 3 and resiliently supported in position by a facing 75 of rubber or other resilient material bonded to the segmental lever elements.

To the left of the lever device 73 is arranged floating plate 78 having an annular fulcrum flange 79 facing in the same direction as the flange 72 and engaging the same side of the lever device 73. The side of the flange 79 opposite the lever device forms a groove acting as a seat for a biasing spring 80, the other end of the spring engaging the plate 28 to urge the plate 78 to the normal position shown in Figure 1. A rubber bumper 82 is bonded to the plate 78 and is engageable with the adjacent end of the collar 65.

A small plunger 84 is slidable within the left-hand end of the plunger 14 as shown in Figure 1 and is urged toward the left by a spring 85. The left-hand end of the plunger 84, as shown in Figure 1, engages the adjacent reduced end 86 of the valve 44.

Surrounding the reduced valve end 86 and preferably recessed into the end of the valve and bonded thereto is a combined seal and bumper element 87. The plate 28 is provided at its radially inner edge with an annular flange 89 having an opening therethrough of larger diameter than the reduced valve end 86 and projecting inwardly over the adjacent end of the sleeve 35. The flange 89 is in the path of travel of the seal 87 and is normally spaced therefrom when the parts are in the off positions shown in Figure 1.

*Operation*

The parts normally occupy the positions shown in Figure 1. The valve element 49 engages the seal 50, and accordingly, the ports 48 are effectively sealed against leakage of air into the motor chamber 24. The motor chamber 23 is in constant communication with the source of vacuum through nipple 25, and since the valve groove 45 communicates with the ports 48, the motor will be vacuum suspended.

When the brakes are to be operated, the brake pedal will be depressed and the rod 56 will move to the right, carrying with it the valve 44. The plunger 84 will be moved against the tension of the spring 85. This spring forms the sole resistance against initial movement of the brake pedal except for the negligible friction of the parts, and accordingly, the apparatus provides the desirable "soft" pedal. This relatively light resistance continues until the motor is initially energized, which operation takes place when the valve 44 is moved to the right to close communication between the groove 45 and ports 48 and to crack such ports to the atmosphere around the left-hand end of the valve 44.

When the motor chambers 23 and 24 are cut off from communication with each other and air is admitted into the motor chamber 24, the pressure responsive unit 22 will start to move to the right. The fulcrum shoulder 72 will engage the lever device outwardly of the shoulder 71, thus tending to swing the inner ends of the lever elements 74 relatively to the left. This movement is resisted by the spring 80 during the initial operation, and accordingly, force is applied to the lever elements 74 radially outwardly and inwardly of the shoulder 71. Accordingly, a force is applied to this shoulder to move the plate 70 and hence the plunger 14 to displace fluid from the master cylinder 13 to the wheel cylinders 16. The force of the spring 80 is sufficient to prevent swinging of the inner ends of the lever elements 74 toward the left as viewed in Figure 1 for the opening of the residual pressure valve of the master cylinder and for the building up of pressure in the master cylinder to a predetermined point, for example, 60 to 80 pounds p.s.i. Accordingly, this initial operation takes place without any engagement of the plate 78 with the head of the plunger 84.

When the pre-determined pressure referred to is reached, reaction forces acting against the plunger 14 will cause the plate 78 to be moved relatively toward the left, the lever elements 74 rocking about the fulcrum shoulder 71. The plate 78 will be brought into engagement with the head of the plunger 84 and accordingly will transmit a reaction force to the valve 44 and thence through rod 56 to the brake pedal. The pedal, accordingly, will be provided with a highly accurate and desirable "feel" in accordance with the disclosure of the co-pending application referred to.

As previously stated, leakage around the valve 44 is prevented when the parts are in the off positions shown in Figure 1. Such leakage inevitably starts, however, as soon as the valve element 49 leaves the seal 50, there being a slow seepage of air around the valve 44 into the motor chamber 23. This air seepage is not sufficient to disturb the normal functioning of the apparatus.

In the motor energizing position of the valve 44 in accordance with the present construction, the seal 87 will be brought into engagement with the flange 89 and will be held thereagainst by a pedal-applied pressure, and this engagement prevents any leakage of air around the valve 44. This functioning of the parts is of importance particularly in the event of a failure of power in the motor during brake application.

With the structure of the co-pending application referred to, a failure of power, occurring for example through the stalling of the vehicle engine, will "kill" the vacuum in the motor chamber 23 sufficiently rapidly to reduce the effectiveness of the booster motor for assisting in the application of the brakes. In this connection, it is pointed out that it is conventional in booster mechanisms of this type to connect the vacuum chamber 23 to the intake manifold through the medium of a conventional check valve 27, and the stalling of the vehicle engine in itself will not affect the vacuum in the motor chamber 23. The pressure in this chamber will rise, however, if leakage occurs around the valve 44 during a failure of power for the booster motor. If, under such conditions, the vehicle is headed down grade at a reasonable or substantial speed, the gradual decreasing of the energization of the booster motor makes it quite difficult to bring the vehicle to a full stop. With the present construction, the leakage seal provided between the seal 87 and flange 89 permits the maintenance of vacuum in the chamber 23 indefinitely so long as the brake pedal is maintained depressed, and accordingly, the present construction provides an increased safety factor in operation.

As a matter of fact, if a failure in power should occur through the stalling of the motor when the brake is not applied and the operator desires to stop the vehicle, the brake pedal may be depressed to move the valve from the position shown in Figure 1 to the motor energized sealing position shown in Figure 2, in which case, the motor will be substantially fully energized for the proper application of the brakes. Some leakage will occur during movement of the valve 44 between its extreme positions, but the time element involved for movement of the valve is so slight that the leakage will be negligible.

During the normal operation of the brakes, a point of power "run-out" will occur, that is, the point at which atmospheric pressure is established in the motor chamber 24 and the booster motor will be fully energized. This energization does not furnish sufficient power for the maximum application of the brakes, and under such conditions, the parts will be moved to the position shown in Figure 2 with the valve moved to engage the head of the plunger 84 against the plate 78 with the latter engaged against the bumper 82. Beyond the point of power "run-out" therefore, the operator will exert axial pedal force straight through the apparatus to the plunger 14 to assist the motor in the full application of the brakes.

It will be apparent from Figure 2 that the maximum brake application in the manner stated occurs also with the seal 87 in firm engagement with the flange 89. Part of the manual thrust therefore is effected through the seal 87 and flange 89 and part through the plate 78 and bumper 82. The latter engagement limits maximum movement of the valve 44 and prevents such application of pressure between the seal 87 and flange 89 as may be apt to effect distortion of this flange.

It will be apparent therefore that the present construction is advantageous over the structure of the co-pending application referred to since, while it embodies all of the advantages of such construction, it combines therewith a novel and simple means whereby a sliding valve can be sealed against leakage at both limits of its movement, namely in the off position and in the operative position. Therefore, any reduction in differential pressures affecting the motor will be solely under the control of the operator through the valve 44 and will not be affected by the stalling of the vehicle engine. This is highly important as a safety factor since it provides means for maintaining the necessary vacuum in the chamber 23 for the stopping of the vehicle in the event of a failure of power for the booster motor, and this is true, regardless of whether the power failure occurs during operation of the booster mechanism or before the brake pedal is applied.

It is to be understood that the form of the invention shown and described is for the purpose of illustration, the invention being defined in the appended claims.

I claim:

1. A fluid motor comprising a casing, a pressure responsive unit in said casing dividing the latter to form a pair of chambers one of which is a constant pressure chamber, a force transmitting member mechanically connected to said unit and projecting through said casing, for connecting said constant pressure chamber to a source of relatively low pressure, a sleeve carried by said pressure responsive unit, a valve slidable in said sleeve between a normal position and a motor energizing position, said sleeve being provided with a port communicating with the other motor chamber, said valve being grooved to connect said port to said constant pressure chamber when said valve is in said normal position, a seal carried by said pressure responsive unit at one end of said valve and having a space radially inwardly thereof connected to a source of higher pressure, said end of said valve engaging said seal when said valve is in its normal position to prevent leakage from said source of higher pressure around said valve, said valve, in said motor energizing position, being spaced from said seal to open said port to communication with said space within said seal, and sealing means engaging pressure responsive unit and the other end of said valve for sealing the interior of said sleeve and the grooves of said valve from said constant pressure chamber when said valve is in said motor energizing position.

2. A fluid motor in accordance with claim 1 wherein the first-named end of said valve is provided with an annular valve element engaging said first-named seal when said valve is in said normal position, said motor being a vacuum motor and the space within said first-named seal being in communication with the atmosphere.

3. A fluid motor in accordance with claim 1 provided with an annular flange carried by said pressure responsive unit, said sealing means comprising a resilient annular seal carried by said other end of said valve and engageable with said flange when said valve is in said motor energizing position.

4. A fluid motor in accordance with claim 1 provided with an annular flange carried by said pressure responsive unit, said sealing means comprising a resilient annular seal carried by said other end of said valve and engageable with said flange when said valve is in said motor energizing position, and means independent of said sealing means connected for limiting movement of said valve relative to said force transmitting member in the motor-energizing position of said valve.

5. A fluid motor having a pressure responsive unit therein dividing said motor to form a pair of chambers, a force transmitting member mechanically connected to said unit, a sleeve carried by said pressure responsive unit and projecting axially from said pressure responsive unit away from said force transmitting member, said sleeve being provided with a port therethrough communicating with one of said motor chambers, a spool valve slidable in said sleeve and provided with an annular groove communicating with said port when said valve is in a normal position, said valve having a longitudinal groove communicating between said annular groove and the other chamber of said motor to balance pressures in said motor chambers when said valve is in said normal position, means for connecting said other motor chamber to a source of vacuum, a seal carried by said pressure responsive unit and having space radially inwardly thereof communicating with the atmosphere, said seal engaging one end of said valve when the latter is in said normal position, an annular flange carried by said pressure responsive unit and projecting inwardly over the end of said sleeve which extends towards said force transmitting member, and a seal carried by the other end of said valve, said last-named seal being normally spaced longitudinally from said flange and being engageable therewith when said valve is moved from said normal position in one direction to a motor energizing position in which said annular groove is moved out of registration with said port and the first-named end of said valve opens said port, said second-named seal, when said valve is in said motor energizing position, being connected to seal said longitudinal groove from communication with said other motor chamber.

6. A fluid motor in accordance with claim 5 wherein the first-named end of said valve is provided with an annular valve element projecting therefrom and engaging said first-named seal when said valve is in normal position.

7. A fluid motor in accordance with claim 5 provided with means independent of said last-named seal connected for limiting movement of said valve relative to said plunger to transmit direct manual forces from said valve to said plunger.

8. A fluid motor having a pressure responsive unit therein, a force transmitting member connected to said unit, an axial sleeve carried by said pressure responsive unit and provided with a port therethrough communicating with one of said motor chambers, a spool valve in said sleeve provided with a groove communicating with said port and with the other motor chamber to balance pressures in said motor when said valve is in a normal off position, means for connecting said other motor chamber to a source of relatively low pressure, a resilient seal carried by said pressure responsive unit and having a space radially inwardly thereof communicating with a source of relatively higher pressure and engaging one end of said valve when the latter is in said normal position to seal said one motor chamber from said source of higher pressure, said valve being slidable from such position to a second position in which said groove is disconnected from said port and the latter is opened around said one end of said valve to said source of higher pressure, a resilient seal carried by the other end of said valve, said pressure responsive unit comprising a pair of plates, and a flange carried by one of said plates between said valve and said plunger and engaged by said last-named seal when said valve is in said second position to seal said valve groove from said other motor chamber.

9. A fluid motor in accordance with claim 8 provided with means connected to bias said valve to its normal position, and means connected for limiting movement of said valve toward said plunger independently of said flange and said last-named seal.

10. A fluid motor comprising a casing having a pressure responsive unit including a force transmitting member projecting from said casing, said unit dividing said casing to form a pair of motor chambers, a follow-up control slide valve reciprocably supported within said pressure responsive unit, said valve and said pressure responsive unit having cooperating passage means to connect said motor chambers to each other to balance pressures therein when said valve is in a normal position, said valve being movable from said normal position to a second position in which it disconnects said motor chambers from each other and connects one of said motor chambers to a source of high pressure to move said pressure responsive unit, a resilient seal in said pressure responsive unit interposed between and engaging one end of said valve and an adjacent portion of said pressure-responsive unit to seal said one chamber from said high-pressure source when said valve is in said normal position, a second resilient seal in said unit at the other end of said valve interposed between and engaging said valve and a portion of said pressure responsive unit adjacent thereto when said valve is moved from said normal position to connect said one chamber to said high pressure source, said last-named seal being arranged to positively seal said motor chambers against communication with each other in power applied position of said valve, a relatively small plunger axially slidable in said force transmitting member and engaging said other end of said valve, a spring connected to bias said small plunger toward said valve, and means connected for limiting movement of said small plunger relative to said force transmitting member upon movement of said valve away from said normal position.

11. A fluid motor in accordance with claim 10 wherein the means for limiting said movement of said small plunger comprises a head on such plunger, and a plate engaging the adjacent end of said force transmitting member and engageable with said head.

12. A fluid motor in accordance with claim 10 wherein the means for limiting said movement of said small plunger comprises a head on such plunger, a plate engaging the adjacent end of said force transmitting member and engageable with said head, and means connected for transmitting from said force transmitting member through said plate to said head reactions when said motor is energized.

13. A fluid motor in accordance with claim 10 wherein the means for limiting said movement of said small plunger comprises a head on such plunger, a plate engaging the adjacent end of said force transmitting member and engageable with said head, and lever means having fulcrum engagement with said pressure responsive unit, said force transmitting member and said plate for transmitting to the latter and thence through said head to said valve reactions when said motor is energized.

References Cited in the file of this patent

UNITED STATES PATENTS

| | | |
|---|---|---|
| 1,620,513 | Bragg et al. | Mar. 8, 1927 |
| 1,856,342 | Kratz | May 3, 1932 |
| 1,897,787 | Berry | Feb. 14, 1933 |
| 1,904,267 | Bragg et al. | Apr. 18, 1933 |
| 2,095,833 | Rockwell | Oct. 12, 1937 |
| 2,173,836 | Goodchap | Sept. 26, 1939 |
| 2,260,491 | Stelzer | Oct. 28, 1941 |
| 2,273,989 | Price | Feb. 24, 1942 |
| 2,331,238 | Schnell | Oct. 5, 1943 |
| 2,603,066 | Rockwell | July 15, 1952 |
| 2,646,665 | Rockwell | July 28, 1953 |
| 2,790,306 | Ingres | Apr. 30, 1957 |

FOREIGN PATENTS

| | | |
|---|---|---|
| 747,273 | France | Mar. 28, 1933 |